Oct. 20, 1936. G. BAUMGARTNER Re. 20,134
RAILWAY TRAFFIC CONTROLLING APPARATUS
Original Filed March 11, 1930
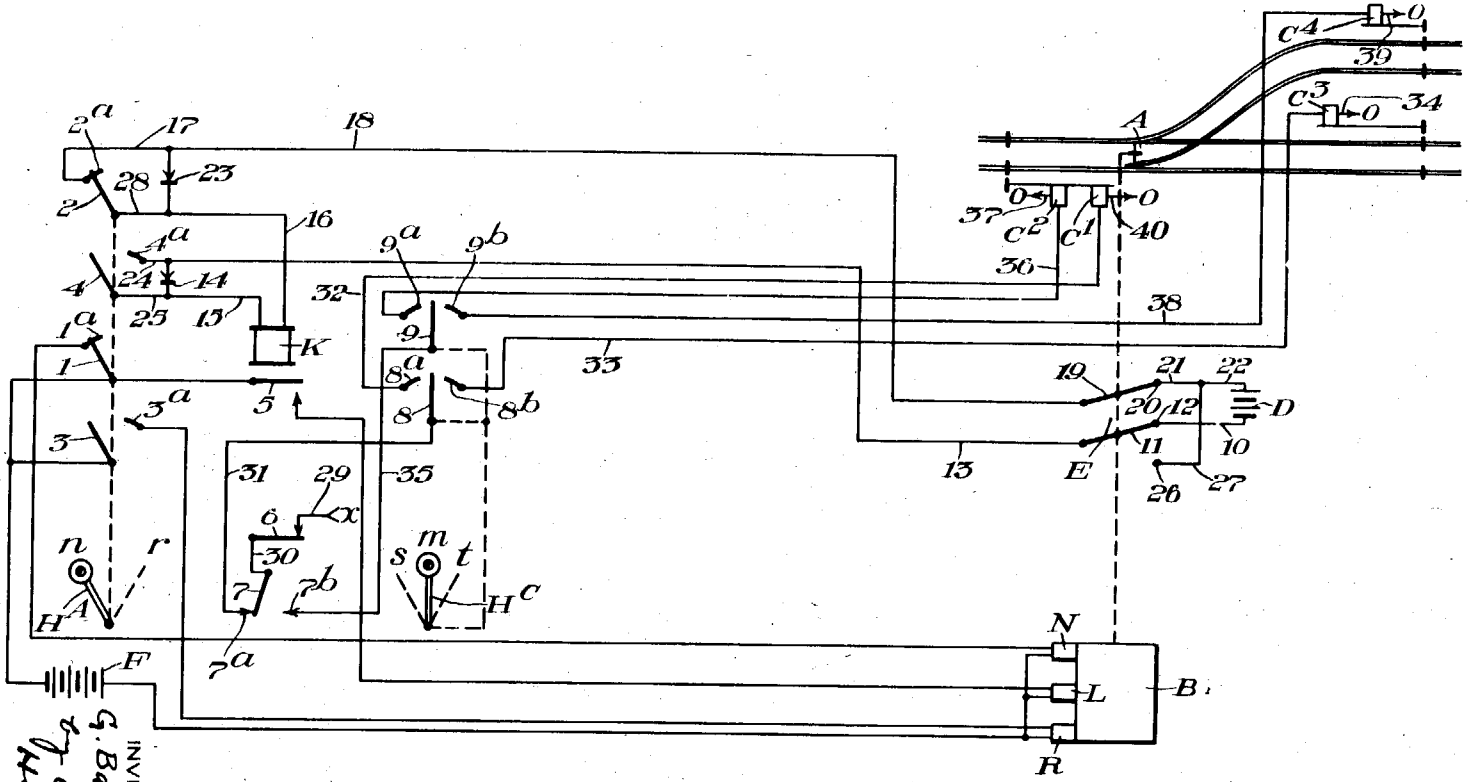
INVENTOR;
G. Baumgartner,
by A. R. Venell
His Attorney Reissued Oct. 20, 1936

Re. 20,134

UNITED STATES PATENT OFFICE 20,134

RAILWAY TRAFFIC CONTROLLING APPARATUS

Godfrey Baumgartner, Astoria, N. Y., assignor to The Union Switch & Signal Company, Swissvale, Pa., a corporation of Pennsylvania Original No. 1,824,589, dated September 22, 1931, Serial No. 434,918, March 11, 1930. Application for reissue April 7, 1934, Serial No. 719,616

23 Claims. (Cl. 246—3)

My invention relates to railway traffic controlling apparatus, and particularly to apparatus of the type involving switches and signals controlled by any suitable manually operated or manually controlled means such as by the levers of an interlocking machine.

One object of my invention is to provide means for controlling the well-known polarized indication relay commonly employed in apparatus of this type in such manner that this relay can not become energized unless the switch and its associated lever occupy corresponding positions.

Another object of my invention is to control the usual lock magnet in an electropneumatic switch operating mechanism by the polarized indication relay in such manner that this lock magnet will be energized whenever the polarized indication relay is deenergized.

I will describe one form of apparatus embodying my invention, and will then point out the novel features thereof in claims.

The accompanying drawing is a diagrammatic view illustrating one form of apparatus embodying my invention.

Referring to the drawing, the reference character A designates a railway switch which is actuated by a switch operating mechanism B comprising a normal magnet N, a reverse magnet R, and a lock magnet L. This mechanism may, for example, be of the type shown and described in Letters Patent of the United States, No. 1,202,164, granted to J. P. Coleman, on October 24, 1916, although the specific form of switch actuating mechanism forms no part of my present invention. It is sufficient to say that when the normal magnet N and lock magnet L are energized, the switch is moved to its normal position, when the reverse magnet R and lock magnet L are energized, the switch is moved to its reverse position; and the switch operating mechanism is locked at all times except when the lock magnet L is energized.

The switch operating mechanism B is controlled by a manually operable switch lever $H^A$, which may, for example, be one of a group of similar levers in an interlocking machine. As here shown, lever $H^A$ may be moved into a normal position *n*, in which it is illustrated in the drawing, or into a reverse position *r*, indicated by a dotted line in the drawing. The lever $H^A$ is provided with normal contacts 1—$1^a$ and 2—$2^a$ which are closed when the lever occupies its *n* position and with reverse contacts 3—$3^a$ and 4—$4^a$ which are closed, when the lever occupies its *r* position.

The switch operating mechanism B is also controlled, in part, by a polarized indication relay K which, in turn, is controlled by the lever $H^A$ and by a pole-changer E operated by the switch A. Relay K is provided with a back contact 5, a front contact 6, a normal contact 7—$7^a$, and a reverse contact 7—$7^b$.

Westbound traffic, that is, traffic moving from left to right over switch A, is controlled by two signals $C^1$ and $C^2$. Traffic moving in the opposite direction over switch A is controlled by two similar signals $C^3$ and $C^4$ which in the form here shown, are mounted on separate masts. The signals C are illustrated in the drawing as semaphore signals but this particular form is not essential.

The signals are controlled by a manually operable signal lever $H^C$ and by the polarized indication relay K previously described. The signal lever $H^C$ will usually be located in the same interlocking machine as the switch lever $H^A$ and, as here shown, may be moved into three positions, designated by the reference characters *m*, *s* and *t*, respectively. When lever $H^C$ is moved to its *s* position, it closes two contacts 8—$8^a$ and 9—$9^a$; when lever $H^C$ is moved to its *t* position, it closes two other contacts 8—$8^b$ and 9—$9^b$; and when lever $H^C$ occupies its *m* position, all contacts controlled by the lever are open.

As shown in the drawing, switch lever $H^A$ occupies its *n* position, and normal magnet N is energized over a circuit including a suitable source of current, here shown as a battery F, and a normal contact 1—$1^a$ of lever $H^A$, this circuit being obvious from an inspection of the drawing. Switch A occupies its normal position. Since switch A occupies its normal position, a circuit is also completed for relay K over which current of what I shall term "normal" polarity flows from a suitable source, such as a battery D, through wire 10, contact 11—12 of circuit controller E, line wire 13, asymmetric unit 14, wire 15, winding of relay K, wire 16, normal contact 2—$2^a$ of lever $H^A$, wire 17, line wire 18, contact 19—20 of circuit controller E, and wires 21 and 22 back to battery D. Relay K is therefore energized in its normal direction so that its front contact 6 and normal contact 7—$7^a$ are closed. Switch lever $H^C$ occupies its *m* position in which its contacts 8—$8^a$, 8—$8^b$, 9—$9^a$ and 9—$9^b$ are all open. Signals $C^1$, $C^2$, $C^3$ and $C^4$ are therefore deenergized, so that these signals all indicate stop.

I will now assume that it is desired to reverse switch A. To accomplish this result, switch lever $H^A$ is moved from its *n* to its *r* position, thereby opening its normal contacts 1—$1^a$ and 2—$2^a$, and closing its reverse contacts 3—3ᵃ and 4—4ᵃ. When normal contact 1—1ᵃ of lever $H^A$ is opened, the circuit for normal magnet N is broken at this contact, so that normal magnet N becomes deenergized, and when normal contact 2—2ᵃ of lever $H^A$ is opened, the circuit for relay K is broken so that relay K also becomes deenergized. When relay K becomes deenergized, it closes its back contact 5, thereby energizing lock magnet L by current from battery F over a circuit which will be obvious from the drawing. When reverse contact 4—4ᵃ of lever $H^A$ becomes closed, a circuit is closed for relay K which may be traced from battery D through wire 10, contact 11—12 of circuit controller E, line wire 13, contact 4—4ᵃ of lever $H^A$, wires 25 and 15, winding of relay K, wire 16, asymmetric unit 23, line wire 18, contact 19—20 of circuit controller E, and wires 21 and 22 back to battery D, but asymmetric unit 23 is connected in this circuit in such manner that no current flows in this circuit, and relay K therefore remains deenergized. When contact 3—3ᵃ of lever $H^A$ becomes closed, current is supplied from battery F to reverse magnet R, and since magnets L and R are now both energized, switch A is moved to its reverse position. As soon as switch A begins to move, all circuits for relay K are opened at circuit controller E, and it will be apparent, therefore, that relay K will remain deenergized as long as switch A is between its normal and its reverse positions. When the switch reaches its full reverse position, however, another circuit for relay K is closed at circuit controller E, and current of reverse polarity flows from battery D, through wire 10, contact 19—12 of circuit controller E, line wire 18, asymmetric unit 23, wire 16, winding of relay K, wires 15 and 25, contact 4—4ᵃ of lever $H^A$, wire 24, line wire 13, contact 11—26 of circuit controller E, and wires 27 and 22 back to battery D. Relay K therefore now becomes energized in the reverse direction so that back contact 5 and normal contact 7—7ᵃ of relay K are opened, and front contact 6 and reverse contact 7—7ᵇ become closed. When back contact 5 of relay K is opened the circuit for lock magnet L is opened, and lock magnet L becomes deenergized, thereby locking the switch mechanism in its reverse position.

If, now, it is desired to restore switch A to its normal position, switch lever $H^A$ is restored to its *n* position. Reverse contacts 3—3ᵃ and 4—4ᵃ of lever $H^A$ are then opened and normal contacts 1—1ᵃ and 2—2ᵃ become closed. When reverse contact 3—3ᵃ of lever $H^A$ is opened, the circuit for reverse magnet R is opened at this contact, and reverse magnet R becomes deenergized, and when reverse contact 4—4ᵃ of lever $H^A$ is opened, the circuit for relay K including this contact is opened, so that relay K again becomes deenergized. Front contact 6 of relay K is then opened, and back contact 5 becomes closed. When back contact 5 of relay K becomes closed, the circuit for lock magnet L is closed at this contact, and lock magnet L becomes energized. When normal contact 2—2ᵃ of lever $H^A$ becomes closed, another circuit is completed for relay K which may be traced from battery D through wire 10, contact 19—12 of circuit controller E, line wire 18, wire 17, normal contact 2—2ᵃ of lever $H^A$, wires 28 and 16, winding of relay K, wire 15, asymmetric unit 14, line wire 13, contact 11—26 of circuit controller E, and wires 27 and 22 back to battery D, but the asymmetric unit 14, is connected in this circuit in such manner that no current flows in this circuit, and relay K therefore remains deenergized. When normal contact 1—1ᵃ of lever $H^A$ becomes closed, normal magnet N again becomes energized and since magnets L and N are then both energized, switch A is moved to its normal position. As soon as switch A starts to move, all circuits for relay K are opened at circuit controller E, and relay K is therefore prevented from becoming energized while the switch occupies an intermediate position. When the switch reaches its full normal position, however, the closing of contacts 19—20 and 11—12 of circuit controller E completes the circuit previously traced for relay K, and relay K again becomes energized in its normal direction, thereby opening its back contact 5 and reverse contact 7—7ᵇ and closing its front contact 6 and normal contact 7—7ᵃ. When back contact 5 of relay K is opened, lock magnet L becomes deenergized thereby locking the switch in its normal position. All parts are then restored to the positions in which they are illustrated in the drawing.

It will be apparent from the foregoing that relay K cannot become energized unless the switch lever $H^A$ and the switch A occupy corresponding positions. For, if the switch lever occupies its reverse or *r* position, and the switch A its normal position, asymmetric unit 23 will prevent current from being supplied to relay K, and, if switch lever $H^A$ occupies its normal or *n* position, and the switch A its reverse position, asymmetric unit 14 will prevent current from being supplied to relay K. Furthermore, if the switch occupies any position between its normal and reverse positions, all circuits for relay K will be open at circuit controller E.

It will also be apparent from the foregoing that if switch A is moved from the position corresponding to the position of switch lever $H^A$ for any reason, the switch will be automatically restored to its proper position, because, as pointed out in the preceding paragraph, when the lever and switch do not occupy corresponding positions, relay K becomes deenergized, and when relay K is deenergized, lock magnet L becomes energized. When lock magnet L is energized, the switch will move either to its normal or its reverse position depending upon whether switch lever $H^A$ then occupies its *n* position so that the normal magnet N is energized, or its *r* position so that the reverse magnet R is energized.

If signal lever $H^C$ is moved to its *s* position when relay K is energized in the normal direction, signal $C^1$ will move to its proceed position, the circuit for this signal being from terminal X of a suitable source of current not shown in the drawing through wire 29, front contact 6 of relay K, wire 30, normal contact 7—7ᵃ of relay K, wire 31, contact 8—8ᵃ of signal lever $H^C$, wire 32, operating mechanism of signal $C^1$ and wire 40 to the other terminal O of the same source. If signal lever $H^C$ is moved to its *t* position under these conditions, signal $C^3$ will be cleared, the circuit for this signal being from terminal X through wire 29, front contact 6 of relay K, wire 30, normal contact 7—7ᵃ of relay K, wire 31, contact 8—8ᵇ of signal lever $H^C$, wire 33, operating mechanism of signal $C^3$, and wire 34 to terminal O. When relay K is energized in the reverse direction, so that its normal contact 7—7ᵃ is opened and its reverse contact 7—7ᵇ is closed, signal $C^2$ will be cleared, if signal lever $H^C$ is moved to its *s* position, and signal $C^4$ will be cleared if signal lever $H^C$ is moved to its *t* position. The circuit for signal $C^2$ under these conditions, is from terminal X through wire 29, front contact 6 of relay K, wire 30, reverse contact 7—7$^b$ of relay K, wire 35, contact 9—9$^a$ of signal lever $H^C$, wire 36, operating mechanism of signal $C^2$, and wire 37 to terminal O, and the circuit for signal $C^4$ is from terminal X through wire 29, front contact 6 of relay K, wire 30, contact 7—7$^b$ of relay K, wire 35, contact 9—9$^b$ of signal lever $H^C$, wire 38, operating mechanism of signal $C^4$, and wire 39 to terminal O.

While I have shown the relay K as controlling the operating mechanism for switch S and the signals $C^1$, $C^2$, $C^3$ and $C^4$, it will be readily understood that the relay K may be used to control any other suitable indicating or governing apparatus.

Although I have herein shown and described only one form of railway traffic controlling apparatus embodying my invention, it is understood that various changes and modifications may be made therein within the scope of the appended claims without departing from the spirit and scope of my invention.

Having thus described my invention, what I claim is:

1. In combination, a railway switch having normal and reverse positions, a manually operable lever having normal and reverse positions, means for operating said switch to its normal or its reverse position according as the lever occupies its normal or its reverse position, an indication relay, a circuit including a contact operatively associated with said switch and a contact operated mechanically by said lever for energizing said relay when and only when said switch and said lever occupy corresponding positions, and means for preventing operation of said switch unless said relay is deenergized.

2. In combination, a railway switch having normal and reverse positions, a manually operable lever having normal and reverse positions, an indication relay, circuits each including contacts operatively associated with said switch and contacts operated by said lever for energizing said indication relay when and only when said switch and said lever occupy corresponding positions, means including other contacts operated by said lever for moving the switch to its normal or its reverse position according as the lever occupies its normal or reverse position, and means for preventing operation of said switch unless said relay is deenergized.

3. In combination, a railway switch having normal and reverse positions, a manually operable lever having normal and reverse positions, an indication relay, means including contacts mechanically operated by said lever for always energizing said relay when said switch and said lever occupy corresponding positions, and a controlling circuit for said switch including a back contact of said relay and a contact mechanically operated by said lever.

4. In combination, a railway switch having normal and reverse positions, a manually operable lever having normal and reverse positions, a polarized indication relay, circuits each including contacts operatively associated with said switch and contacts operated by said lever for supplying said relay with current of one polarity when and only when said lever and said switch both occupy their normal positions and for supplying said relay with current of the opposite polarity when and only when said lever and said switch both occupy their reverse positions, and governing means controlled by said relay and by other contacts operated by said lever.

5. In combination, a railway switch having normal and reverse positions, a manually operable lever having normal and reverse positions, a polarized indication relay, an energy source adjacent said switch, circuits each including said source and contacts operatively associated with said switch and contacts operated by said lever for supplying said relay with current of one polarity when and only when said lever and said switch both occupy their normal positions and for supplying said relay with current of the opposite polarity when and only when said lever and said switch both occupy their reverse positions, and means effective when and only when said relay is deenergized for moving said switch to its normal or its reverse position according as said lever occupies its normal or its reverse position.

6. In combination, a railway switch, a manually operable lever having normal and reverse positions, an indication relay, means effective when said relay is deenergized for moving said switch to a normal or a reverse position according as said lever occupies its normal or its reverse position and for preventing movement of the switch unless the relay is deenergized, and circuits each including contacts operatively associated with said switch and contacts operated by said lever for energizing said indication relay when and only when said switch and said lever occupy corresponding positions.

7. In combination, a railway switch, a manually operable lever having normal and reverse positions, an indication relay, means including contacts of said lever and effective when said relay is deenergized for moving said switch to a normal or a reverse position according as said lever occupies its normal or its reverse position and for preventing movement of the switch unless the relay is deenergized, and means including other contacts of said lever for always supplying said relay with current of normal polarity when said lever and said switch both occupy their normal positions and for always supplying said relay with current of the opposite polarity when said lever and said switch both occupy their reverse positions.

8. In combination, a railway switch having normal and reverse positions, a manually operable lever having normal and reverse positions, an indication relay located adjacent said lever, a circuit including a contact operatively associated with said switch and a contact operated by said lever for energizing said relay when and only when said switch and said lever occupy corresponding positions, means for operating said switch when and only when said relay is deenergized, a signal governing traffic over said switch, a lever for the control of said signal, and means for preventing said signal from giving a proceed indication unless said relay is energized.

9. In combination, a railway switch having normal and reverse positions, a manually operable lever having normal and reverse positions, a polarized indication relay located adjacent said lever, circuits each including contacts operatively associated with said switch and contacts operated by said lever for supplying said relay with current of one polarity when and only when said lever and said switch both occupy their normal positions and for supplying said relay with current of the opposite polarity when and only when said lever and said switch both occupy their reverse positions, means effective when and only when said relay is deenergized for moving said switch to its normal or its reverse position according as said lever occupies its normal or its reverse position, a second manually operable lever, main and auxiliary signals controlled by said lever for governing traffic over said switch, and means for preventing any of said signals from giving a proceed indication unless said relay is energized and for selecting as between main and auxiliary signals according as the relay is energized by current of normal or opposite polarity.

10. In combination, a railway switch, a manually operable lever having normal and reverse positions, an indication relay, means effective when said indication relay is deenergized for moving said switch to a normal or a reverse position according as said lever occupies its normal or its reverse position, and means controlled by said lever and by said switch and including asymmetric units for energizing said indication relay when and only when said lever and said switch occupy corresponding positions.

11. In combination, a railway switch, a manually operable lever having normal and reverse positions, an indication relay, means controlled by a back contact of said indication relay for moving said switch to a normal or a reverse position according as said lever occupies its normal or its reverse position, and means controlled by said lever and by said switch and including asymmetric units for energizing said indication relay when and only when said lever and said switch occupy corresponding positions.

12. In combination, a railway switch having normal and reverse positions, a manually operable lever having normal and reverse contacts, a polarized indication relay, means including a first asymmetric unit for supplying said polarized indication relay with current of one polarity when and only when the normal contacts of said lever are closed and said switch occupies its normal position, means including a second asymmetric unit for supplying said polarized indication relay with current of the opposite polarity when and only when the reverse contacts of said lever are closed and said switch occupies its reverse position, and governing means controlled by said indication relay.

13. In combination, a railway switch having normal and reverse positions, a manually operable lever having normal and reverse contacts, a polarized indication relay, means including a first asymmetric unit for supplying said polarized indication relay with current of one polarity when and only when the normal contacts of said lever are closed and said switch occupies its normal position, means including a second asymmetric unit for supplying said polarized indication relay with current of the opposite polarity when and only when the reverse contacts of said lever are closed and said switch occupies its reverse position, and means effective when said indication relay is deenergized for moving said switch to its normal or its reverse position according as the normal or reverse contacts of said lever are closed.

14. In combination, a railway switch having normal and reverse positions, a manually operable lever having normal and reverse contacts, a polarized indication relay, means including a first asymmetric unit for supplying said polarized indication relay with current of one polarity when and only when the normal contacts of said lever are closed and said switch occupies its normal position, means including a second asymmetric unit for supplying said polarized indication relay with current of the opposite polarity when and only when the reverse contacts of said lever are closed and said switch occupies its reverse position, and means controlled by a back contact of said indication relay for moving said switch to its normal or its reverse position according as the normal or reverse contacts of said lever are closed.

15. In combination, a railway switch having normal and reverse positions, operating mechanism for said switch comprising a lock magnet, a manually operable lever having normal and reverse positions, an indication relay, means including asymmetric units for energizing said indication relay when and only when said switch and said lever occupy corresponding positions, and means for energizing said lock magnet when and only when said indication relay is deenergized.

16. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first asymmetric unit and a normal contact of said lever for at times supplying said relay with current of said one polarity from said line wires, means including a second asymmetric unit and a reverse contact of said lever for at other times supplying said polarized indication relay with current of the other polarity from said line wires, and governing means controlled by said relay.

17. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first asymmetric unit and a normal contact of said lever for at times supplying said relay with current of said one polarity from said line wires, means including a second asymmetric unit and a reverse contact of said lever for at other times supplying said polarized indication relay with current of the other polarity from said line wires, and governing means controlled by said relay in accordance with the polarity of the current supplied to said relay.

18. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first asymmetric unit and a normal contact of said lever for at times supplying said relay with current of said one polarity from said line wires, means including a second asymmetric unit and a reverse contact of said lever for at other times supplying said polarized indication relay with current of the other polarity from said line wires, operating mechanism of said switch comprising a lock magnet, and means for energizing said lock magnet when and only when said indication relay is deenergized.

19. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first asymmetric unit and a normal contact of said lever for at times supplying said relay with current of said one polarity from said lines wires, means including a second asymmetric unit and a reverse contact of said lever for at other times supplying said polarized indication relay with current of the other polarity from said line wires, and means controlled by a back contact of said indication relay for operating said switch to its normal or its reverse position according as the normal or reverse contacts of said lever are closed.

20. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first asymmetric unit and a normal contact of said lever for at times supplying said relay with current of said one polarity from said line wires, means including a second asymmetric unit and a reverse contact of said lever for at other times supplying said polarized indication relay with current of the other polarity from said line wires, operating mechanism for said switch including a normal and a reverse magnet as well as a lock magnet, means for energizing said lock magnet when and only when said indication relay is deenergized, means for energizing the normal magnet when the normal contacts of said lever are closed, means for energizing the reverse magnet when the reverse contacts of said lever are closed, and governing means controlled by said indication relay.

21. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first normal contact of said lever and a first asymmetric unit for at times connecting said indication relay with said line wires, said first asymmetric unit being arranged to permit current of said one polarity but not of said other polarity to be supplied to said indication relay from said line wires, means including a first reverse contact of said lever and a second asymmetric unit, said second asymmetric unit being arranged to permit current of said other polarity but not of said one polarity to be supplied to said indication relay from said line wires, and signals for governing traffic over said switch controlled in accordance with the polarity of the current supplied to said relay.

22. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first normal contact of said lever and a first asymmetric unit for at times connecting said indication relay with said line wires, said first asymmetric unit being arranged to permit current of said one polarity but not of said other polarity to be supplied to said indication relay from said line wires, means including a first reverse contact of said lever and a second asymmetric unit, said second asymmetric unit being arranged to permit current of said other polarity but not of said one polarity to be supplied to said indication relay from said line wires, operating mechanism for said switch comprising a normal and a reverse magnet as well as a lock magnet, means for energizing said lock magnet when and only when said indication relay is deenergized, means for energizing said normal magnet when the normal contacts of said lever are closed, means for energizing said reverse magnet when the reverse contacts of said lever are closed, and signals for governing traffic over said switch controlled by said indication relay in accordance with the polarity of the current supplied to said indication relay.

23. In combination, a railway switch having normal and reverse positions, a pair of line wires, means for supplying said line wires with current of one polarity or the other according as said switch occupies its normal or its reverse position, a polarized indication relay, a manually operable lever having normal and reverse contacts, means including a first normal contact of said lever and a first asymmetric unit for at times connecting said indication relay with said line wires, said first asymmetric unit being arranged to permit current of said one polarity but not of said other polarity to be supplied to said indication relay from said line wires, means including a first reverse contact of said lever and a second asymmetric unit for at other times connecting said indication relay with said line wires, said second asymmetric unit being arranged to permit current of said other polarity but not of said one polarity to be supplied to said indication relay from said line wires, operating mechanism for said switch comprising a normal and a reverse magnet as well as a lock magnet, means for energizing said lock magnet when and only when said indication relay is deenergized, means for energizing said normal magnet when the normal contacts of said lever are closed, means for energizing said reverse magnet when the reverse contacts of said lever are closed, a second manually operable lever having normal and reverse positions, and signals for governing traffic over said switch controlled by said second manually operable lever and said polarized indication relay in accordance with the position of said lever and the polarity of the current supplied to said relay.

GODFREY BAUMGARTNER.